(12) United States Patent
Cash et al.

(10) Patent No.: US 8,191,739 B1
(45) Date of Patent: Jun. 5, 2012

(54) MIXED GAS METHOD FOR FILLING AEROSOL CONTAINERS AND AEROSOL FORMULAS FOR IMPROVED ENVIRONMENTAL PROFILE BY VOC/HFC REDUCTION

(75) Inventors: Randy S. Cash, Adairsville, GA (US); Ian R. Gecker, Las Vegas, NV (US); Jeffrey J. Miller, Atlanta, GA (US); David L. Patterson, Smyma, GA (US); Stephen A. Thomas, Powder Springs, GA (US)

(73) Assignee: AMREP, Inc., Marietta, GA (US)

( * ) Notice: Subject to any disclaimer, the term of this patent is extended or adjusted under 35 U.S.C. 154(b) by 862 days.

(21) Appl. No.: 12/246,837

(22) Filed: Oct. 7, 2008

Related U.S. Application Data

(60) Provisional application No. 61/057,249, filed on May 30, 2008.

(51) Int. Cl.
*B65D 83/00* (2006.01)
(52) U.S. Cl. .......................... 222/394; 222/190; 424/40
(58) Field of Classification Search .................. 222/190, 222/401, 402.1, 402.21–402.25, 394–399; 424/40–47; 516/1–10
See application file for complete search history.

(56) References Cited

U.S. PATENT DOCUMENTS

| | | | |
|---|---|---|---|
| 2,772,820 A | 12/1956 | O'Donnell | |
| 2,777,735 A | 1/1957 | Green | |
| 3,191,816 A | 6/1965 | Fead et al. | |
| 3,348,743 A | 10/1967 | Green | |
| 3,540,624 A | 11/1970 | Green | |
| 3,541,581 A | 11/1970 | Monson | |
| 3,970,584 A * | 7/1976 | Hart et al. | 516/10 |
| 4,439,342 A * | 3/1984 | Albanese | 516/6 |
| 4,536,390 A | 8/1985 | Padden | |
| 4,668,507 A | 5/1987 | Tomkins et al. | |
| 4,780,100 A | 10/1988 | Moll | |
| 4,913,197 A | 4/1990 | Friedrich | |
| 4,915,881 A | 4/1990 | Straw et al. | |
| 4,980,085 A | 12/1990 | Straw et al. | |
| 5,248,495 A | 9/1993 | Patterson et al. | |
| 5,306,444 A * | 4/1994 | Kitamura et al. | 510/490 |
| 5,858,343 A | 1/1999 | Szymczak | |
| 6,407,044 B2 | 6/2002 | Dixon | |
| 6,581,807 B1 * | 6/2003 | Mekata | 222/402.1 |
| 6,729,559 B2 * | 5/2004 | Zanma et al. | 239/225.1 |
| 7,131,602 B2 * | 11/2006 | Otomo et al. | 239/337 |
| 2004/0011061 A1 | 1/2004 | Bitz et al. | |
| 2005/0180926 A1 | 8/2005 | Lecourt | |
| 2007/0108312 A1 * | 5/2007 | Matsumoto | 239/308 |
| 2007/0231290 A1 | 10/2007 | Robinson | |
| 2008/0031908 A1 * | 2/2008 | Aubrun-Sonneville et al. | 424/401 |

FOREIGN PATENT DOCUMENTS

| | | | | |
|---|---|---|---|---|
| JP | 2001-172616 | * | 6/2001 | 222/190 |
| JP | 2007-217039 | * | 8/2007 | 222/190 |
| JP | 2007-320639 | * | 12/2007 | 222/190 |

OTHER PUBLICATIONS

Montfort A. Johnsen, Wayne E. Dorland, & Eleonore Kanar Dorland, The Aerosol Handbook, 1972, 251-286, 1st Ed., Wayne E. Dorland Company, Caldwell, NJ.
Paul A. Sanders, Principles of Aerosol Technology, 1970, 18-33, Van Nostrand Reinhold Company, New York, NY.
Tom Anthony, New Propellant Systems Based on Chlorinated Solvents & Compressed Gases, Aerosol Age, Sep. 1962, 31-33, 124-125.
Robert C. Webster, Compressed Gas Propellants for Non-Food Applications, Aerosol Age, Jun. 1961, 20-25, 85.

* cited by examiner

*Primary Examiner* — Lien Ngo
(74) *Attorney, Agent, or Firm* — Hunton & Williams LLP

(57) ABSTRACT

An aerosol dispenser that is pressurized by both compressed gas and liquefied gas is able to retain desired spray characteristics, such as foaming, while reducing volatile organic compound content or hydrofluorocarbon content. A minimal amount of liquefied gas allows the product to retain its desired spray characteristics, and the compressed gas causes higher internal pressures while reducing the amount of liquefied gas needed as a propellant. The aerosol container may be filled by first placing a desired aerosol product in the container, followed by introducing liquefied gas followed by compressed gas, or by introducing compressed gas followed by liquefied gas.

19 Claims, No Drawings

MIXED GAS METHOD FOR FILLING AEROSOL CONTAINERS AND AEROSOL FORMULAS FOR IMPROVED ENVIRONMENTAL PROFILE BY VOC/HFC REDUCTION

CROSS-REFERENCE TO RELATED APPLICATION

This application claims the benefit of U.S. Provisional Patent Application Ser. No. 61/057,249, filed May 30, 2008.

BACKGROUND

1. Technical Field

The present invention relates generally to aerosol products and methods of making aerosol products. There is a desire to reduce the VOC content of aerosol products, while retaining desired spray characteristics.

2. Description of the Related Art

Aerosol containers have been popular since their inception, because of their marked ease of use and variety of applications. The term "aerosol" includes products that can be dispensed in a stream, spray, powder, gel, or a foam. Innovations in this area of technology have enabled aerosol products that contain organic solvents or water or combinations thereof, as well as products that foam upon ejection and products that delay foaming after ejection. In a typical aerosol dispenser, a container contains a liquid product (also called an "aerosol formula concentrate") and one or more pressurized propellants that pressurize the product and drive the product out of the container when desired.

The particular pressure of the contents of the aerosol container is important. First, there are practical limitations that relate to particular products used in aerosol containers. Depending on the aerosol dispenser's contents, pressure will affect such considerations as particle size, foaming capabilities, and the ability to evacuate the dispenser's contents completely. Second, there are regulatory constraints set by the government, industrial associations, or other authorities for safety or other reasons. For example, the United States Department of Transportation ("DOT") regulations dictate the maximum pressure of aerosol containers at 130 degrees (Fahrenheit) for a given type of container. See 49 C.F.R. §173.306. Because of these constraints, the right balance of propellants should be used in order to achieve the desired characteristics of the dispensed product and maximize the amount of product that is capable of being dispensed, while observing the DOT's pressure limits.

Typically, two types of propellants used in aerosol dispensers are liquefied gases and compressed gases. In the aerosol industry, liquefied gases that are used as propellants can include liquefied petroleum gases ("LPGs") and hydrofluorocarbons ("HFCs"). As used in the context of this patent, the term "liquefied gas" is used to encompass both LPGs and HFCs. In the aerosol industry, LPGs include hydrocarbon propellants (e.g., propane, n-butane, isobutane), and in the context of this patent, the terms "LPG" and "hydrocarbon propellant" are used interchangeably. In the aerosol industry, HFCs include 1,1 difluoroethane ($CH_3CHF_2$), known in the aerosol industry as "152a," and 1,1,1,2 tetrafluoroethane ($CF_3CH_2F$), known in the aerosol industry as "134a." In the context of this patent, the terms "HFC" and "hydrofluorocarbon propellant" are used interchangeably. Compressed gasses have included nitrogen, carbon dioxide, and nitrous oxide.

The use of a compressed gas alone as a propellant has drawbacks, in certain applications, where the pressure is not sustained over the use of the aerosol container; the contents are over-pressurized at the beginning of the consumer's use and become under-pressurized prior to the complete use of the product. The amount of compressed gas retained in a product is dependant on its solubility in the product being dispensed. The less soluble the compressed gas is in the product, the more compressed gas is retained in the vapor phase (i.e., the headspace) within the aerosol container. "Thus, internal vapour pressure of the aerosol dispenser diminishes as the contents are depleted, causing changes in the rate and characteristics of the spray," U.S. Patent Application Pub. No. 2007/0231290, at [0006] (filed Mar. 31, 2006) ("Robinson"), which is the case where nitrogen is used as the compressed gas. In particular, the use of nitrogen as a compressed gas propellant has been discouraged in the art because of nitrogen's insolubility in the product; this insolubility causes rapid pressure depletion and changed spray characteristics, and for these reasons nitrogen generally has limited applications as a compressed gas propellant in the aerosol industry.

The addition of LPGs and/or HFCs contributes to the aerosol product's desirable spray characteristics. More specifically, certain types of liquefied gases allows the product to foam upon dispensing. However, the use of LPGs or HFCs alone in typical formulations known in the art has its own drawbacks concerning cost and environmental profile, as discussed below. Despite these drawbacks, liquefied gases are presently used as propellants in many aerosol products because of the desirability of foaming aerosol products. In order to foam upon dispensing, aerosol products must contain liquefied gas; for this reason, liquefied gas—whether LPGs, HFCs, and blends thereof—is used in the aerosol industry as the propellant in a variety of foaming aerosol products.

As mentioned above, certain concerns influence the use of LPGs. First, the use of LPGs has significant environmental concerns, as LPGs fall within a class of chemicals known as volatile organic compounds ("VOCs"). VOCs are precursors of ground level smog, which is a significant daily environmental hazard in many urbanized areas. On an individual level, VOCs have been associated with a variety of health problems, ranging from irritation to chronic problems. From a manufacturing standpoint, VOC content in aerosol dispensers is regulated by state and regional governmental entities such as the California Air Resources Board ("CARB"), to name one example, and is also Federally regulated by the United States Environmental Protection Agency ("EPA"). While CARB regulations apply to VOCs—including LPGs—HFCs such as 134a and 152a are not considered VOCs. Thus, 134a and 152a are often looked to for VOC reduction in the aerosol industry today. Nonetheless, the use of 134a and 152a presents different environmental concerns, as 134a and 152a have high global warming potentials (GWP). (By comparison, LPGs have a very low GWP and compressed gases have essentially a zero GWP.) Presently HFCs remain the most costly propellant, followed by LPGs, while compressed gasses are the least expensive in the array of options.

For these reasons, there is a desire to use as little liquefied gas as possible, while still achieving an optimal internal pressure, in order to ensure that the aerosol product can be satisfactorily used (e.g., it can foam upon dispensing) while minimizing the environmental and health hazards of VOCs.

Various methods have been developed in an attempt to reduce the VOC content of aerosol dispensers, while retaining the benefits associated with liquefied gas use. See, e.g., Robinson at [0009] to [0015]. For example, Robinson is directed at reducing VOC content in aerosols. Robinson identifies several of the problems associated with simply reducing the VOC content in aerosol containers. Robinson states that reducing the level of liquefied gas in aerosol dispensers can result in excess product retention in the container, increased particle size in the dispensed product, or a premature reduction in spray rate, all of which affect the performance and desirability of aerosol dispensers. Robinson notes that acetone solvents and microemulsions, or a reconfiguration of the aerosol dispenser hardware, have been used to attempt to reduce VOC content with mixed success. Robinson attempts to address VOC content issues by using a single phase aerosol composition that uses liquefied gas propellants.

Unlike the methods and devices taught in Robinson and other disclosures, it has been found that a reduction of VOC levels contained in aerosol dispensers, while retaining spray characteristics, can be achieved by using both compressed gas and liquefied gas. As discussed above, typically aerosol dispensers use either compressed gas or liquefied gas in order to propel the contents from the container, but the use of both compressed gas and liquefied gas, while maintaining spray characteristics such as foaming capabilities, is new. The use of liquefied gas allows the product to retain desired spray characteristics (e.g., foaming capabilities), while the use of compressed gas allows the manufacture of aerosol containers whose propellants contain less liquefied gas (and hence less VOCs and/or less greenhouse gases), while maintaining adequate pressurization for propellant purposes.

Additionally and/or alternatively, additional pressurization can be achieved by the particular sequence of adding particular components to the aerosol container. In the context of this patent, the terms "filling" and "gassing" are used interchangeably, to refer to the introduction of propellants into the aerosol container. In one sequence of gassing, after the desired aerosol formula concentrate or concentrates are introduced into the aerosol container, liquefied gas is added to the aerosol container, and then the compressed gas is added. A second sequence of gassing is done by adding compressed gas to the aerosol container (after the desired aerosol formula concentrate or concentrates are introduced into the container), and then adding the liquefied gas. One benefit of using the second sequence of gassing is that ambient and elevated temperature pressure increases are achieved that are higher than each of the individual pressures of the liquefied gas and compressed gas, due to the mutual insolubility (or low solubility) of the liquefied gas, compressed gas, and aerosol formula concentrate in each other. In both of these gassing sequences, nitrogen works well as the compressed gas, due to its inert and insoluble characteristics. Other compressed gases, such as carbon dioxide and nitrous oxide, may also be used, but these specific compressed gases present various manufacturing constraints and container corrosion issues when used in water-based aerosol formula concentrates.

By requiring less liquefied gas, the aerosol products not only cost less to produce, but they also contain and release less VOCs when used, which provides obvious environmental, health, and regulatory benefits. And, these aerosol products retain desired spray characteristics, such as the ability to foam upon dispensing.

DETAILED DESCRIPTION

This patent relates generally to methods of filling aerosol containers with particular components, and the aerosol products filled using these methods.

As mentioned above, one benefit of using both compressed gas propellants as well as liquefied gas is that the aerosol product contains a minimal amount of VOCs (or HFCs), while retaining desirable product characteristics, such as foaming. This reduction of VOCs (or HFCs) is clearly seen where the aerosol formula concentrate, the liquefied gas, and the compressed gas possess certain qualities. The term "aerosol formula concentrate" is understood in the art to mean all chemical constituents before dilution by injection or introduction of the propellant. Suitable aerosol formula concentrates include water-based products, which are products whose compositions contain large quantities of water in combination with other chemical ingredients and mutually soluble organic solvents such as alcohols, glycol ethers, and ketones. Examples of suitable aerosol formula concentrates include water-based cleaners, which is a generic class of window cleaners, glass cleaners, hard surface cleaners, all-purpose cleaners, baseboard cleaners, furniture polishes, etc. The exact compositions of these aerosol formula concentrates are known in the art. Other aerosol formula concentrates are also suitable, as long as enough water is present in the total formula to ensure that the liquefied gas, described in greater detail below, remains insoluble in the aerosol formula concentrate.

A compressed gas is also used. In the aerosol industry generally, "compressed gases" can be soluble or insoluble in water or solvent mixtures as used in the aerosol formula concentrate. Suitable compressed gases should be inert and insoluble. In a preferred embodiment, nitrogen is the compressed gas, because nitrogen is inert and is not soluble in water. Other inert, insoluble compressed gases include helium and argon; both of these gases would be expected to work effectively as compressed gas propellants. Compared to nitrogen, helium and argon present practical drawbacks because they are more expensive and impractical than nitrogen for use in aerosol products. However, from a scientific standpoint, helium and argon would be expected to be acceptable propellants, due to their inert nature and insolubility. Compared to argon, helium would be a better substitute for nitrogen, although helium's low molecular weight may cause significant leakage problems in an aerosol container. In the aerosol industry, carbon dioxide and nitrous oxide have also been used as compressed gases to act as propellants. However, nitrous oxide and carbon dioxide are soluble in water and a variety of organic solvents, and to the extent the compressed gas is soluble, the vapor pressure of the compressed gas will be depressed due to its solubility in the aerosol formula concentrate. Moreover, the use of carbon dioxide and nitrous oxide in water-based products can present corrosion issues as well as various manufacturing constraints.

A liquefied gas is also used. As used in the aerosol industry, liquefied gases can be both soluble and/or insoluble in the product to be dispensed, depending on the product's composition and the amount of water present in the product. In large part, liquefied gases are insoluble in products whose compositions include large portions of water. As mentioned above, liquefied gases include LPGs and HFCs. Three LPGs are preferred: n-butane, isobutane, and propane. These LPGs fall into a class also often referred to as "hydrocarbon propellants." N-butane ($C_4H_{10}(n)$) is commonly referred to as "A-17" in the aerosol industry, as it has a 70-degree (Fahrenheit) vapor pressure of 17 psig. Isobutane ($C_4H_{10}(iso)$) is commonly referred to as "A-31" in the aerosol industry, as it has a 70-degree (Fahrenheit) vapor pressure of 31 psig. Propane ($C_3H_8$) is commonly referred to as "A-108" in the aerosol industry, as it has a 70-degree (Fahrenheit) vapor pressure of 108 psig. In order to achieve propellant blends of specific vapor pressures, these three components can be blended in almost any proportion to yield any desired specific vapor pressure. For example, A-46 can be a mixture of 15.15% (weight) isobutane with 84.85% (weight) of propane. Additional examples of commonly used propellant blends for aerosol propellants are provided in Tables 1(a), 1(b) and 1(c). In addition to n-butane, isobutane, and propane, other hydrocarbon propellants may be used to achieve the VOC reduction benefits. For example, isopentane and n-pentane may also behave in the same manner as n-butane, isobutane, and propane. Regardless of the particular hydrocarbon propellant or mixture of hydrocarbon propellants used, the hydrocarbon propellants should be insoluble in water.

TABLE 1(a)

Examples of Commonly Used LPG Blends for Aerosols.

|  | 31 psig @ 70 F. | 31 psig @ 70 F. | 31 psig @ 70 F. |
|---|---|---|---|
| n-Butane |  | 88% | 55.5% |
| Isobutane | 100% |  | 37.0% |
| Propane |  | 12% | 7.5% |

TABLE 1(b)

Examples of Commonly Used LPG Blends for Aerosols.

|  | 46 psig @ 70 F. | 46 psig @ 70 F. | 46 psig @ 70 F. |
|---|---|---|---|
| n-Butane |  | 74.14% | 46.90% |
| Isobutane | 15.15% |  | 31.20% |
| Propane | 84.85% | 25.86% | 21.90% |

TABLE 1(c)

Examples of Commonly Used LPG Blends for Aerosols.

|  | 70 psig @ 70 F. | 70 psig @ 70 F. | 70 psig @ 70 F. |
|---|---|---|---|
| n-Butane |  | 49.38% | 31.30% |
| Isobutane | 57.11% |  | 20.90% |
| Propane | 42.89% | 50.62% | 47.80% |

In addition to the LPGs listed above, other liquefied gases such as HFCs might also be used as propellants. HFCs such as 152a and 134a may be suitable propellants, depending on the water content or content of other solvents present in the aerosol formula concentrate or concentrates. 152a has a 70-degree (Fahrenheit) vapor pressure of 63 psig, and 134a has a 70-degree (Fahrenheit) vapor pressure of 70 psig. In general, therefore, the term "liquefied gas," which includes LPGs and HFCs, encompasses any blend of n-butane, isobutane, propane, or any other hydrocarbon propellant, as well as any blend of LPGs and any blend of LPGs and HFCs. The specific examples given are commonly used in the aerosol industry, but various additional combinations of LPGs and HFCs may be used; the examples given are intended to illustrate the various types of liquefied gases that exist and are not intended to limit the scope of the term "liquefied gas."

As stated above, the benefits yielded are seen where the liquefied gases used are insoluble in water. Table 2 lists solubilities in water for the various hydrocarbon propellants and liquefied hydrofluorocarbons described above. Table 3 lists the water solubilities in these various liquefied gases. Table 4 lists compressed gas propellant solubilities in water, at one atmosphere absolute, at 77 degrees (Fahrenheit). Table 5 lists compressed gas propellant solubilities in organic solvents commonly used in aerosol products.

TABLE 2

Liquefied Gas Solubilities in Water.

| Propellant | Solubility (g/100 mL) | Propellant Pressures at 70 degrees (F.) |
|---|---|---|
| A-17 | 0.008 | 17 psig |
| A-31 | 0.008 | 31 psig |
| A-46 | 0.008* | 46 psig |
| A-70 | 0.007* | 70 psig |
| A-108 | 0.007 | 108 psig |
| 152a | 1.700 | 63 psig |
| 134a | 0.950 | 70 psig |

*Expected solubility based on isobutane/propane compositions.

TABLE 3

Water Solubilities in Propellants.

| Propellant | Solubility (g/100 mL) |
|---|---|
| A-17 | 0.007 |
| A-31 | 0.008 |
| A-108 | 0.016 |
| 152a | 0.170 |
| 134a | 0.095 |

TABLE 4

Compressed Gas Propellant Solubilities in Water.

| Propellant | Solubility (mL/100 g) |
|---|---|
| $CO_2$ | 8.20 |
| $NO_2$ | 60.00 |
| $N_2$ | 1.60 |
| Ar | 3.00 |
| He | 0.90 |

TABLE 5

Compressed Gas Propellant Solubilities in Organic Solvents (mL/100 g).

| Solvent | Solubility of $CO_2$ | Solubility of $NO_2$ | Solubility of $N_2$ |
|---|---|---|---|
| Acetone | 6.30 | 5.30 | 0.150 |
| Ethyl Alcohol | 2.60 | 2.80 | 0.140 |
| Xylene | 2.15 | N/A | 0.120 |
| Toluene | 1.80 | N/A | 0.120 |
| Petroleum Distillates | varies by aromatic content | 2.10 | 0.109 |
| Mineral Oil | N/A | N/A | 0.071 |

In addition to the use of both liquefied gas and compressed gas propellants, the particular sequence of adding particular components to the aerosol container while filling or gassing the aerosol container contributes to its pressurization. Various methods of filling aerosol containers are known in the art. The known methods involve the following three general steps. First, the empty aerosol container is filled with the required amount of the aerosol formula concentrate. Second, an aerosol valve is attached onto the container. The aerosol valve is a mechanical fitment that is clinched or crimped onto and sits atop the aerosol container and determines spray form, shape, and rate of the product as it is emitted from the container. Third, the required amount of propellant (whether liquefied gas or compressed gas) is injected into the aerosol container through the aerosol valve. This process is called "throughthe-valve" filling or gassing. It is noted that in an alternate method of gassing, the propellant may be introduced before the aerosol valve has been clinched or crimped. This process is called "under-the-cup" gassing or filling. Either of the industry-standard filling methods (i.e., under-the-cup or through-the-valve) will work suitably well.

Alternate sequences of gassing the aerosol container can be used in order to achieve VOC reduction. Under a first sequence of gassing the aerosol container, the aerosol container is first filled with a desired amount of an aerosol formula concentrate or concentrates. Second, a suitable liquefied gas is introduced into the container using either through-the-valve or under-the-cup filling. Third, after the valve has been clinched onto the container, a suitable compressed gas is injected into the aerosol container using through-the-valve filling, which completes the pressurization of the aerosol container.

Under a second sequence of gassing the aerosol container, the order of addition of the suitable liquefied gas and the suitable compressed gas is reversed. First, the aerosol container is filled with the required amount of an aerosol formula concentrate or concentrates. Second, a suitable compressed gas, such as nitrogen, is introduced into the container using either under-the-cup or through-the-valve filling. Third, after the valve has been clinched onto the container, the liquefied gas is injected using through-the-valve filling, which completes the pressurization of the aerosol container. This second sequence is advantageous in that it causes an increase in internal pressure as compared to the industry-standard filling methods, which allows greater formula flexibility while retaining desired product qualities and spray characteristics. For example, following the second sequence, less compressed gas is required due to the increased internal pressure.

Table 6 lists representative examples of the various filling techniques that can be employed by following either the first sequence or the second sequence, using either under-the-cup gassing or through-the-valve gassing.

TABLE 6

Filling Techniques

| | First Sequence, Under-the-cup | Second Sequence, Under-the-Cup | First Sequence, Through-the-Valve | Second Sequence, Through-the-valve |
|---|---|---|---|---|
| Step 1 | Fill container with aerosol formula concentrate | Fill container with aerosol formula concentrate | Fill container with aerosol formula concentrate | Fill container with aerosol formula concentrate |
| Step 2 | Inject liquefied gas into container under the cup | Inject compressed gas into container under the cup | Clinch valve onto container | Clinch valve onto container |
| Step 3 | Clinch valve onto container | Clinch valve onto container | Inject liquefied gas into container through the valve | Inject compressed gas into container through the valve |
| Step 4 | Inject compressed gas into container through the valve | Inject liquefied gas into container through the valve | Inject compressed gas into container through the valve | Inject liquefied gas into container through the valve |

By utilizing using one of these alternate sequences of filling aerosol containers with both compressed gas and liquefied gas, the pressurized aerosol container contains higher internal container pressures that overcome the drawbacks of using either low amounts of LPGs alone or compressed gas alone as a propellant. Also, the second sequence of filling aerosol containers results in higher than expected ambient and elevated temperature pressures. This sequence of filling the aerosol container is not suggested by the prior art; the prior art references teach away from using this sequence by suggesting that this sequence will not work in a desirable way. See, e.g., U.S. Pat. No. 4,980,085 col. 1, 11. 15-28 (filed May 3, 1989) ("This means that pentane/butane mixtures cannot be incorporated into gel base in a conventional, partly filed pressure vessel, even when the headspace is pressurised with air or nitrogen.").

Although one of the benefits of using both compressed gas and liquefied gas by using one of the two filling sequences is that less LPGs or HFCs are required, thus reducing the VOCs contained in the aerosol product while maintaining spray characteristics (e.g., foaming capabilities), another consideration in the manufacturing of aerosol containers are government regulations, such as the DOT regulations. See 49 C.F.R. §173.306. As mentioned above, the DOT regulations set the maximum pressures limits at 130 degrees (Fahrenheit) for various aerosol containers of specified structure and strength. The highest pressure allowed for a commonly used aerosol container, designated a 2Q container, is 180 psig. The regulations also specify that a 2N-rated aerosol container must not exceed 140 psig at 130 degrees (Fahrenheit) and a 2P-rated container must not exceed 140 psig at 130 degrees (Fahrenheit).

In order to ensure that aerosol containers filled with both compressed gas and liquefied gas pursuant to each of the filling sequences comply with DOT regulations, tests were conducted to develop pressure readings at 70 and 130 degrees (Fahrenheit) with various loadings of nitrogen and liquefied gas combinations. Data from these tests establish DOT pressure-related limits. The results of these tests using the first sequence of gassing per Table 6 are given in Tables 7(a) and 7(b), and the results using the second sequence per Table 6 are given in Table 8. These test results give amounts of liquefied gas and compressed gas that are usable in aerosol products, while retaining desired spray characteristics such as foaming capabilities. The test results in Table 8 also demonstrate the increase in pressure of the aerosol containers that results from using the second sequence of gassing.

Regarding the data in Tables 7(a) and 7(b), in performing these tests using the first sequence of gassing per Table 6, after the aerosol concentrate was loaded into the container, a preset amount of liquefied gas was loaded into the container. Regarding liquefied gas amounts, the tests assume a 454 gram total product fill; thus, 4.5 grams of liquefied gas equals approximately 1% of the total product fill, 9.0 grams equals approximately 2% of the total product fill, and 13.6 grams equals approximately 3% of the total product fill. After the liquefied gas was introduced into the container (i.e., the container was "filled"), nitrogen was introduced (i.e., "filled") at various preset pressures. Internal pressures of the aerosol containers were then determined at 70 degrees (Fahrenheit) and then again at 130 degrees (Fahrenheit).

The 130 degrees (Fahrenheit) pressures establish the upper DOT pressure limit that is suitable for an aerosol container. With this in mind, the liquefied gas fill levels were chosen as potential upper liquefied gas fills based on current VOC limits for a variety of water-based cleaners. The tested aerosol products retained the ability to foam upon dispensing.

TABLE 7(a)

Co-Propellant Pressure Data—First Sequence, using Glass Cleaner.

| Compressed Gas Pressures | | Resultant Internal Pressure (psig) | |
|---|---|---|---|
| | | Using 4.5 g A-46 @ 70 F. | Using 4.5 g A-46 @ 130 F. |
| 50 psi $N_2$ | Test #1 | 49.2 | 91.7 |
| | Test #2 | 48.9 | 90.3 |
| 70 psi $N_2$ | Test #1 | 67.9 | 113.1 |
| | Test #2 | 67.0 | 108.2 |
| 100 psi $N_2$ | Test #1 | 98.9 | 148.0 |
| | Test #2 | 99.2 | 145.5 |
| 120 psi $N_2$ | Test #1 | 117.1 | 162.3 |
| | Test #2 | 116.3 | 165.3 |
| 150 psi $N_2$ | Test #1 | 141.4 | * |
| | Test #2 | 141.6 | * |
| 170 psi $N_2$ | Test #1 | 162.5 | * |
| | Test #2 | 163.7 | * |
| | | Using 9.0 g A-46 @ 70 F. | Using 9.0 g A-46 @ 130 F. |
| 50 psi $N_2$ | Test #1 | 52.3 | 100.0 |
| | Test #2 | 52.1 | 101.5 |
| 70 psi $N_2$ | Test #1 | 69.1 | 119.4 |
| | Test #2 | 68.1 | 118.6 |
| 100 psi $N_2$ | Test #1 | 100.5 | 157.0 |
| | Test #2 | 98.2 | 155.8 |
| 120 psi $N_2$ | Test #1 | 117.8 | 170.0 |
| | Test #2 | 116.6 | 171.4 |
| 150 psi $N_2$ | Test #1 | 142.0 | * |
| | Test #2 | 140.5 | * |
| 170 psi $N_2$ | Test #1 | 164.5 | * |
| | Test #2 | 164.6 | * |
| | | Using 13.6 g A-46 @ 70 F. | 13.6 g A-46 @ 130 F. |
| 50 psi $N_2$ | Test #1 | 54.0 | 106.2 |
| | Test #2 | 54.0 | 103.9 |
| 70 psi $N_2$ | Test #1 | 66.7 | 114.6 |
| | Test #2 | 67.4 | 117.9 |
| 100 psi $N_2$ | Test #1 | 97.4 | 155.5 |
| | Test #2 | 98.3 | 151.9 |
| 120 psi $N_2$ | Test #1 | 114.7 | 168.2 |
| | Test #2 | 116.1 | 171.2 |
| 150 psi $N_2$ | Test #1 | 139.7 | * |
| | Test #2 | 138.3 | * |
| 170 psi $N_2$ | Test #1 | 160.4 | * |
| | Test #2 | 160.8 | * |
| | | Using 4.5 g A-70 @ 70 F. | Using 4.5 g A-70 @ 130 F. |
| 70 psi $N_2$ | Test #1 | 67.6 | 117.2 |
| | Test #2 | 66.8 | 118.3 |
| 100 psi $N_2$ | Test #1 | 99.5 | 145.5 |
| | Test #2 | 100.9 | 145.3 |
| 120 psi $N_2$ | Test #1 | 118.2 | 166.7 |
| | Test #2 | 118.3 | 170.0 |
| 150 psi $N_2$ | Test #1 | 146.3 | * |
| | Test #2 | 146.7 | * |
| 170 psi $N_2$ | Test #1 | 165.0 | * |
| | Test #2 | 167.3 | * |
| | | Using 9.0 g A-70 @ 70 F. | Using 9.0 g A-70 @ 130 F. |
| 70 psi $N_2$ | Test #1 | 66.7 | 126.0 |
| | Test #2 | 66.8 | 127.3 |
| 100 psi $N_2$ | Test #1 | 98.7 | 157.7 |
| | Test #2 | 99.2 | 162.3 |
| 120 psi $N_2$ | Test #1 | 116.5 | 175.3 |
| | Test #2 | 118.5 | 177.5 |
| 150 psi $N_2$ | Test #1 | 145.6 | * |
| | Test #2 | 146.6 | * |
| 170 psi $N_2$ | Test #1 | 163.8 | * |
| | Test #2 | 162.8 | * |
| | | Using 13.6 g A-70 @ 70 F. | Using 13.6 g A-70 @ 130 F. |
| 70 psi $N_2$ | Test #1 | 68.4 | 135.1 |
| | Test #2 | 68.2 | 135.3 |
| 100 psi $N_2$ | Test #1 | 96.7 | 162.8 |
| | Test #2 | 98.6 | 168.1 |
| 120 psi $N_2$ | Test #1 | 117.0 | * |
| | Test #2 | 116.6 | * |
| 150 psi $N_2$ | Test #1 | 144.8 | * |
| | Test #2 | 148.7 | * |
| 170 psi $N_2$ | Test #1 | 163.2 | * |
| | Test #2 | 161.4 | * |

* Pressure exceeded 180 psi DOT regulation for 2Q can.

TABLE 7(b)

Co-Propellant Pressure Data - First Sequence, using Stainless Steel Cleaner.

| Compressed Gas Pressures | | Resultant Internal Pressure (psig) | |
|---|---|---|---|
| | | Using 4.5 g A-46 @ 70 F. | Using 4.5 g A-46 @ 130 F. |
| 50 psi $N_2$ | Test #1 | 32.9 | 51.5 |
| | Test #2 | 37.6 | 51.4 |
| 70 psi $N_2$ | Test #1 | 54.9 | 61.2 |
| | Test #2 | 55.3 | 61.6 |
| 100 psi $N_2$ | Test #1 | 76.2 | 83.1 |
| | Test #2 | 80.1 | 91.9 |
| 120 psi $N_2$ | Test #1 | 100.2 | 117.5 |
| | Test #2 | 97.0 | 104.3 |
| 150 psi $N_2$ | Test #1 | 125.3 | 139.6 |
| | Test #2 | 121.5 | 133.1 |
| 170 psi $N_2$ | Test #1 | 146.2 | 164.7 |
| | Test #2 | 144.3 | 165.1 |
| | | Using 9.0 g A-46 @ 70 F. | Using 9.0 g A-46 @ 130 F. |
| 50 psi $N_2$ | Test #1 | 45.7 | 52.1 |
| | Test #2 | 48.5 | 53.6 |
| 70 psi $N_2$ | Test #1 | 60.6 | 59.3 |
| | Test #2 | 54.3 | 64.0 |
| 100 psi $N_2$ | Test #1 | 83.3 | 95.0 |
| | Test #2 | 77.6 | 105.2 |
| 120 psi $N_2$ | Test #1 | 104.6 | 131.5 |
| | Test #2 | 100.1 | 122.8 |
| 150 psi $N_2$ | Test #1 | 123.9 | 173.4 |
| | Test #2 | 125.3 | 170.0 |
| 170 psi $N_2$ | Test #1 | 146.2 | 158.2 |
| | Test #2 | 151.9 | 157.8 |
| | | Using 13.6 g A-46 @ 70 F. | Using 13.6 g A-46 @ 130 F. |
| 50 psi $N_2$ | Test #1 | 53.9 | 52.6 |
| | Test #2 | 54.3 | 52.3 |
| 70 psi $N_2$ | Test #1 | 65.2 | 105.6 |
| | Test #2 | 58.7 | not established |

TABLE 7(b)-continued

Co-Propellant Pressure Data - First Sequence, using Stainless Steel Cleaner.

| Compressed Gas Pressures | | Resultant Internal Pressure (psig) | |
|---|---|---|---|
| 100 psi N₂ | Test #1 | 90.8 | 133.5 |
| | Test #2 | 90.1 | not established |
| 120 psi N₂ | Test #1 | 103.8 | not established |
| | Test #2 | 104.1 | 155.0 |
| 150 psi N₂ | Test #1 | 127.8 | * |
| | Test #2 | 130.1 | * |
| 170 psi N₂ | Test #1 | 146.8 | * |
| | Test #2 | 147.3 | * |
| | | Using 4.5 g A-70 @ 70 F. | Using 4.5 g A-70 @ 130 F. |
| 70 psi N₂ | Test #1 | 50.8 | 57.6 |
| | Test #2 | 48.1 | 55.7 |
| 100 psi N₂ | Test #1 | 70.7 | 72.0 |
| | Test #2 | 70.4 | 74.3 |
| 120 psi N₂ | Test #1 | 87.1 | 91.9 |
| | Test #2 | 87.5 | 91.7 |
| 150 psi N₂ | Test #1 | 110.3 | 108.4 |
| | Test #2 | 115.8 | 122.5 |
| 170 psi N₂ | Test #1 | 136.0 | 150.6 |
| | Test #2 | 140.5 | 148.1 |
| | | Using 9.0 g A-70 @ 70 F. | Using 9.0 g A-70 @ 130 F. |
| 70 psi N₂ | Test #1 | 63.2 | 109.7 |
| | Test #2 | 64.3 | 122.3 |
| 100 psi N₂ | Test #1 | 74.4 | 128.6 |
| | Test #2 | 76.1 | 128.6 |
| 120 psi N₂ | Test #1 | 92.6 | not established |
| | Test #2 | 98.3 | 154.5 |
| 150 psi N₂ | Test #1 | 118.1 | 165.7 |
| | Test #2 | 120.9 | 170.4 |
| 170 psi N₂ | Test #1 | 136.6 | * |
| | Test #2 | 142.2 | * |
| | | Using 13.6 g A-70 @ 70 F. | Using 13.6 g A-70 @ 130 F. |
| 70 psi N₂ | Test #1 | 66.3 | 127.8 |
| | Test #2 | 62.2 | 130.9 |
| 100 psi N₂ | Test #1 | 82.5 | 148.6 |
| | Test #2 | 83.4 | 145.2 |
| 120 psi N₂ | Test #1 | 95.1 | 167.3 |
| | Test #2 | 99.9 | 162.2 |
| 150 psi N₂ | Test #1 | 124.0 | * |
| | Test #2 | 126.5 | * |
| 170 psi N₂ | Test #1 | 144.3 | * |
| | Test #2 | 147.5 | * |

* Pressure exceeded 180 psi DOT regulation for 2Q can.

Tests were also performed using the second sequence of gassing per Table 6, the data from which are shown in Tables 8 and 9. In performing these tests, nitrogen was first introduced into an aerosol container that was pre-filled with the aerosol formula concentrate or concentrates. The nitrogen was introduced (i.e., "filled") at various preset pressures. Then, a preset amount of liquefied gas (i.e., the LPG or the HFC) was introduced into the container (i.e., "filled"). Regarding liquefied gas amounts, the tests assume a 454 gram total product fill; thus, 9 grams of liquefied gas equals approximately 2% of the total product fill, 18 grams of liquefied gas equals approximately 4% of the total product fill, and 27 grams of liquefied gas equals approximately 6% of the total product fill. Internal pressures of the aerosol container were determined at 70 degrees (Fahrenheit) and then again at 130 degrees (Fahrenheit).

TABLE 8

Co-Propellant Pressure Data Development

| N₂ Pressure (70-Degree F.), psig | Test Temp. (F.) | Liquefied Gas | Liquefied Gas Amount (g) | 1st Run Resultant Pressure (psi) | 2nd Run Resultant Pressure (psi) |
|---|---|---|---|---|---|
| 20 | 70 | A-17 | 9 | 52 | 52 |
| 20 | 130 | A-17 | 9 | 99.4 | 98.4 |
| 30 | 70 | A-17 | 9 | 61 | 61 |
| 30 | 130 | A-17 | 9 | * | 108.5 |
| 40 | 70 | A-17 | 9 | 73 | 69 |
| 40 | 130 | A-17 | 9 | 117.4 | 121.1 |
| 50 | 70 | A-17 | 9 | 82 | 80 |
| 50 | 130 | A-17 | 9 | 130.6 | 130.9 |
| 60 | 70 | A-17 | 9 | 84 | 85 |
| 60 | 130 | A-17 | 9 | 139.4 | 139.0 |
| 20 | 70 | A-17 | 18 | 52 | 54 |
| 20 | 130 | A-17 | 18 | 102.3 | 99.7 |
| 30 | 70 | A-17 | 18 | 60 | 60 |
| 30 | 130 | A-17 | 18 | 110.6 | 111.4 |
| 40 | 70 | A-17 | 18 | 70 | 70 |
| 40 | 130 | A-17 | 18 | 121.4 | 118.2 |
| 50 | 70 | A-17 | 18 | 77 | 77 |
| 50 | 130 | A-17 | 18 | 126.7 | 131.3 |
| 60 | 70 | A-17 | 18 | 92 | 93 |
| 60 | 130 | A-17 | 18 | 144.3 | 142.2 |
| 20 | 70 | A-17 | 27 | 54 | 54 |
| 20 | 130 | A-17 | 27 | 104.7 | 101.1 |
| 30 | 70 | A-17 | 27 | 60 | 62 |
| 30 | 130 | A-17 | 27 | 112.8 | 108.8 |
| 40 | 70 | A-17 | 27 | 73 | 73 |
| 40 | 130 | A-17 | 27 | 124.2 | 124.3 |
| 50 | 70 | A-17 | 27 | 85 | 86 |
| 50 | 130 | A-17 | 27 | 136.9 | 137.1 |
| 60 | 70 | A-17 | 27 | 92 | 93 |
| 60 | 130 | A-17 | 27 | 144.6 | 144.1 |
| 20 | 70 | A-31 | 9 | 60 | 62 |
| 20 | 130 | A-31 | 9 | 104.8 | 116.4 |
| 30 | 70 | A-31 | 9 | 68 | 70 |
| 30 | 130 | A-31 | 9 | 126.7 | 118.8 |
| 40 | 70 | A-31 | 9 | 80 | 86 |
| 40 | 130 | A-31 | 9 | 134.2 | 140.3 |
| 50 | 70 | A-31 | 9 | 94 | 98 |
| 50 | 130 | A-31 | 9 | 159.7 | * |
| 60 | 70 | A-31 | 9 | 94 | 98 |
| 60 | 130 | A-31 | 9 | 155.9 | 156.6 |
| 20 | 70 | A-31 | 18 | 62 | 64 |
| 20 | 130 | A-31 | 18 | 113.0 | 109.8 |
| 30 | 70 | A-31 | 18 | 76 | 77 |
| 30 | 130 | A-31 | 18 | 128.0 | 137.0 |
| 40 | 70 | A-31 | 18 | 73 | 75 |
| 40 | 130 | A-31 | 18 | 141.1 | 151.1 |
| 50 | 70 | A-31 | 18 | 88 | 90 |
| 50 | 130 | A-31 | 18 | 162.6 | 158.5 |
| 60 | 70 | A-31 | 18 | 92 | 92 |
| 60 | 130 | A-31 | 18 | 170.0 | 161.1 |
| 20 | 70 | A-31 | 27 | 66 | 66 |
| 20 | 130 | A-31 | 27 | 115.5 | * |
| 30 | 70 | A-31 | 27 | 80 | 80 |
| 30 | 130 | A-31 | 27 | 139.7 | 141.1 |
| 40 | 70 | A-31 | 27 | 90 | 92 |
| 40 | 130 | A-31 | 27 | 147.2 | * |
| 50 | 70 | A-31 | 27 | 100 | 98 |
| 50 | 130 | A-31 | 27 | 154.5 | * |
| 60 | 70 | A-31 | 27 | 104 | 106 |
| 60 | 130 | A-31 | 27 | 166.7 | 165.8 |
| 20 | 70 | A-46 | 9 | 67 | ** |
| 20 | 130 | A-46 | 9 | 122 | ** |
| 30 | 70 | A-46 | 9 | 77 | ** |
| 30 | 130 | A-46 | 9 | 133 | ** |
| 40 | 70 | A-46 | 9 | 86 | ** |
| 40 | 130 | A-46 | 9 | 142 | ** |
| 50 | 70 | A-46 | 9 | 95 | ** |
| 50 | 130 | A-46 | 9 | 153 | ** |
| 60 | 70 | A-46 | 9 | 104 | ** |
| 60 | 130 | A-46 | 9 | 161 | ** |
| 20 | 70 | A-46 | 18 | 76 | 76 |
| 20 | 130 | A-46 | 18 | 152.6 | 155.2 |
| 30 | 70 | A-46 | 18 | 88 | 88 |

TABLE 8-continued

Co-Propellant Pressure Data Development

| N₂ Pressure (70-Degree (F.), psig) | Test Temp. (F.) | Liquefied Gas | Liquefied Gas Amount (g) | 1st Run Resultant Pressure (psi) | 2nd Run Resultant Pressure (psi) |
|---|---|---|---|---|---|
| 30 | 130 | A-46 | 18 | 159.6 | 160.9 |
| 40 | 70 | A-46 | 18 | 96 | 102 |
| 40 | 130 | A-46 | 18 | 168.7 | 197.5 |
| 50 | 70 | A-46 | 18 | 108 | 108 |
| 50 | 130 | A-46 | 18 | 183.0 | 179.8 |
| 60 | 70 | A-46 | 18 | 96 | 116 |
| 60 | 130 | A-46 | 18 | 190.2 | 170.3 |
| 20 | 70 | A-46 | 27 | 80 | 80 |
| 20 | 130 | A-46 | 27 | 150.4 | 160.1 |
| 30 | 70 | A-46 | 27 | 90 | 88 |
| 30 | 130 | A-46 | 27 | 167.3 | * |
| 40 | 70 | A-46 | 27 | 102 | 103 |
| 40 | 130 | A-46 | 27 | 184.5 | 166.6 |
| 50 | 70 | A-46 | 27 | 109 | 108 |
| 50 | 130 | A-46 | 27 | 185.3 | 182.0 |
| 60 | 70 | A-46 | 27 | 117 | 118 |
| 60 | 130 | A-46 | 27 | 194.5 | 193.3 |
| 20 | 70 | A-70 | 9 | 76 | ** |
| 20 | 130 | A-70 | 9 | 145 | ** |
| 30 | 70 | A-70 | 9 | 85 | ** |
| 30 | 130 | A-70 | 9 | 153 | ** |
| 40 | 70 | A-70 | 9 | 86 | ** |
| 40 | 130 | A-70 | 9 | 162 | ** |
| 50 | 70 | A-70 | 9 | 90 | ** |
| 50 | 130 | A-70 | 9 | 176 | ** |
| 60 | 70 | A-70 | 9 | 112 | ** |
| 60 | 130 | A-70 | 9 | 188 | ** |
| 20 | 70 | A-70 | 18 | 90 | 90 |
| 20 | 130 | A-70 | 18 | 175.5 | 141.5 |
| 30 | 70 | A-70 | 18 | 98 | 98 |
| 30 | 130 | A-70 | 18 | 185.3 | * |
| 40 | 70 | A-70 | 18 | 108 | 108 |
| 40 | 130 | A-70 | 18 | 187.4 | >182 |
| 50 | 70 | A-70 | 18 | 120 | 120 |
| 50 | 130 | A-70 | 18 | ** | ** |
| 60 | 70 | A-70 | 18 | 130 | 130 |
| 60 | 130 | A-70 | 18 | ** | ** |
| 20 | 70 | A-70 | 27 | 80 | 80 |
| 20 | 130 | A-70 | 27 | 188.6 | 188.8 |
| 30 | 70 | A-70 | 27 | 90 | 88 |
| 30 | 130 | A-70 | 27 | 191.0 | ** |
| 40 | 70 | A-70 | 27 | 102 | 103 |
| 40 | 130 | A-70 | 27 | ** | ** |
| 50 | 70 | A-70 | 27 | 109 | 108 |
| 50 | 130 | A-70 | 27 | ** | ** |
| 60 | 70 | A-70 | 27 | 117 | 118 |
| 60 | 130 | A-70 | 27 | ** | ** |
| 20 | 70 | A-108 | 9 | 132 | 132 |
| 20 | 130 | A-108 | 9 | ** | ** |
| 30 | 70 | A-108 | 9 | 140 | 142 |
| 30 | 130 | A-108 | 9 | ** | ** |
| 20 | 70 | A-108 | 18 | 134 | 136 |
| 20 | 130 | A-108 | 18 | ** | ** |
| 30 | 70 | A-108 | 18 | 144 | 144 |
| 30 | 130 | A-108 | 18 | ** | ** |
| 20 | 70 | A-108 | 27 | 130 | 136 |
| 20 | 130 | A-108 | 27 | ** | ** |
| 30 | 70 | A-108 | 27 | ** | ** |
| 30 | 130 | A-108 | 27 | ** | ** |
| 20 | 70 | 152a | 9 | 80 | 80 |
| 20 | 130 | 152a | 9 | 80 | 83 |
| 40 | 70 | 152a | 9 | 80 | 80 |
| 40 | 130 | 152a | 9 | 93 | 98 |
| 60 | 70 | 152a | 9 | 90 | 94 |
| 60 | 130 | 152a | 9 | 100 | 113 |
| 20 | 70 | 152a | 18 | ** | ** |
| 20 | 130 | 152a | 18 | ** | ** |
| 40 | 70 | 152a | 18 | ** | ** |
| 40 | 130 | 152a | 18 | ** | ** |
| 60 | 70 | 152a | 18 | ** | ** |
| 60 | 130 | 152a | 18 | ** | ** |
| 20 | 70 | 152a | 27 | 102 | 101 |
| 20 | 130 | 152a | 27 | 182 | 183 |
| 40 | 70 | 152a | 27 | 118 | 119 |
| 40 | 130 | 152a | 27 | ** | ** |
| 60 | 70 | 152a | 27 | 132 | 135 |
| 60 | 130 | 152a | 27 | ** | ** |
| 20 | 70 | 134a | 9 | 88 | 93 |
| 20 | 130 | 134a | 9 | 111 | 116 |
| 40 | 70 | 134a | 9 | 90 | 108 |
| 40 | 130 | 134a | 9 | 108 | 129 |
| 60 | 70 | 134a | 9 | 118 | 106 |
| 60 | 130 | 134a | 9 | 130 | 134 |
| 20 | 70 | 134a | 18 | ** | ** |
| 20 | 130 | 134a | 18 | ** | ** |
| 40 | 70 | 134a | 18 | ** | ** |
| 40 | 130 | 134a | 18 | ** | ** |
| 60 | 70 | 134a | 18 | ** | ** |
| 60 | 130 | 134a | 18 | ** | ** |
| 20 | 70 | 134a | 27 | 99 | 100 |
| 20 | 130 | 134a | 27 | 170 | 182 |
| 40 | 70 | 134a | 27 | 116 | 118 |
| 40 | 130 | 134a | 27 | ** | ** |
| 60 | 70 | 134a | 27 | 138 | 134 |
| 60 | 130 | 134a | 27 | ** | ** |

* Data point not Included due to testing error.
** Data point not included due to predicted or actual internal pressure that exceeds DOT limits.

The results of the second-sequence testing are also given in Table 9, which organizes and clarifies the raw data from Table 8. In Table 9, all of the combinations listed are within the DOT's regulations pertaining to aerosol pressure limitations (i.e., 180 psig at 130 degrees (Fahrenheit)). Thus, for example, using 18 grams of A-46 and 50 or 60 psig of nitrogen will give aerosol pressures that exceed the DOT regulations. Entries marked "not usable" indicate propellant amounts and nitrogen pressures that result in pressures that exceed the DOT regulations at the amounts tested.

TABLE 9

Co-Propellant Pressure—Compliant with DOT Specifications

| Propellant | Amount of Propellant (g) | N₂ Pressures Tested (psig) | Internal Pressure Range (psig at 70 F.) | Internal Pressure Range (psig at 130 F.) |
|---|---|---|---|---|
| A-17 | 9 | 20, 30, 40, 50, 60 | 52-85 | 99-139 |
|  | 18 | 20, 30, 40, 50, 60 | 52-93 | 99-144 |
|  | 27 | 20, 30, 40, 50, 60 | 54-93 | 101-144 |
| A-31 | 9 | 20, 30, 40, 50, 60 | 60-98 | 104-159 |
|  | 18 | 20, 30, 40, 50, 60 | 62-92 | 109-170 |
|  | 27 | 20, 30, 40, 50, 60 | 66-106 | 115-166 |

TABLE 9-continued

Co-Propellant Pressure—Compliant with DOT Specifications

| Propellant | Amount of Propellant (g) | $N_2$ Pressures Tested (psig) | Internal Pressure Range (psig at 70 F.) | Internal Pressure Range (psig at 130 F.) |
|---|---|---|---|---|
| A-46 | 9 | 20, 30, 40, 50, 60 | 67-104 | 122-161 |
|  | 18 | 20, 30, 40 | 76-102 | 152-168 |
|  | 27 | 20, 30 | 80-90 | 150-167 |
| A-70 | 9 | 20, 30, 40, 50 | 76-90 | 145-176 |
|  | 18 | 20 | 90 | 175 |
|  | 27 | Not usable | — | Exceeds 180 psig |
| A-108 | 9 | Not usable | 132-136 | Exceeds 180 psig |
|  | 18 | Not usable | 134-144 | Exceeds 180 psig |
|  | 27 | Not usable | 130 | Exceeds 180 psig |
| 152a | 9 | 20, 40, 60 | 80-94 | 80-113 |
|  | 18 | Not usable | — | Exceeds 180 psig |
|  | 27 | 20 | 101-135 | 182-183 |
| 134a | 9 | 20, 40, 60 | 88-118 | 108-134 |
|  | 18 | Not usable | — | Exceeds 180 psig |
|  | 27 | 20 | 99-138 | 170-182 |

As Tables 7-9 show, using the methods described, the compositions tested were able to be used to manufacture aerosol products using as little as 1% (weight) of the desired LPG or HFC, while maintaining the desired spray characteristics of the product. This is a significant improvement over the prior art. For example, under the CARB regulations, upper VOC limits for various products are around 10%-12%.

Table 10 illustrates the benefit of combining compressed gas with liquefied gas in foaming aerosol products. Table 10 lists the various components of several common aerosol products, which could be formulated and pressurized with a combination of liquefied gas and compressed gas. Formula A indicates the typical formulation that is used to meet current VOC regulations, using a water and solvent system with an LPG propellant. Formula B gives a lower VOC formulation, using water and a VOC-exempt solvent, along with an LPG. Formula C gives the lowest VOC formulation possible. Formula C is derived by using water and a VOC-exempt solvent, along with compressed gas. The Federal VOC Limits given are the VOC limits established by the EPA for the respective aerosol products. The CARB VOC Limits are the VOC limits set by CARB, which apply to all consumer products sold in the state of California. The products listed in Table 10 are exemplary of the types of foaming products that could use a combination of compressed gas and liquefied gas. The scope of products that could use a combination of compressed gas and liquefied gas is not intended to be limited to the particular products listed.

TABLE 10

Components of Aerosol Products.

| Component | Formula A | Formula B | Formula C |
|---|---|---|---|
| Glass Cleaner | | | |
| Water | 89.80% | 89.80% | 96.80% |
| VOC Solvents | 5.00% | — | — |
| Non-VOC Solvents | — | 5.00% | 1.00% |
| Surfactant | 0.20% | 0.20% | 0.20% |
| Hydrocarbon Propellant | 5.00% | 5.00% | 2.00% |
| TOTAL >>> | 100.00% | 100.00% | 100.00% |
| Compressed Gas Propellant | — | — | 30-170 psi |
| VOC Content | 10% | 5% | 2% |
| Federal VOC Limit | 12% | | |
| CARB VOC Limit | 12% | | |
| General Purpose Cleaner | | | |
| Water | 90.00% | 90.00% | 95.80% |
| VOC Solvents | 2.50% | — | — |
| Non-VOC Solvents | — | 2.50% | 2.00% |
| Phosphates | 1.00% | 1.00% | — |
| Surfactant | 1.50% | 1.50% | 0.20% |
| Hydrocarbon Propellant | 5.00% | 5.00% | 2.00% |
| TOTAL >>> | 100.00% | 100.00% | 100.00% |
| Compressed Gas Propellant | — | — | 30-170 psi |
| VOC Content | 7.5% | 5% | 2% |
| Federal VOC Limit | 10% | | |
| CARB VOC Limit | 8% | | |
| Stainless Steel Polish | | | |
| Water | 63.50% | 63.50% | 82.00% |
| VOC Solvents | 25.00% | — | — |
| Non-VOC Solvents | 5.00% | 30.00% | 15.00% |
| Surfactant | 1.50% | 1.50% | 1.00% |
| Hydrocarbon Propellant | 5.00% | 5.00% | 2.00% |
| TOTAL >>> | 100.00% | 100.00% | 100.00% |
| Compressed Gas Propellant | — | — | 30-170 psi |
| VOC Content | 30% | 5% | 2% |
| Federal VOC Limit | No Limit | | |
| CARB VOC Limit | 30% | | |
| Dust Mop Treatment | | | |
| Water | 74.00% | 74.00% | 82.00% |
| VOC Solvents | 20.00% | — | — |
| Non-VOC Solvents | — | 20.00% | 15.00% |
| Surfactant | 1.00% | 1.00% | 1.00% |
| Hydrocarbon Propellant | 5.00% | 5.00% | 2.00% |
| TOTAL >>> | 100.00% | 100.00% | 100.00% |
| Compressed Gas Propellant | — | — | 30-170 psi |
| VOC Content | 25% | 5% | 2% |
| Federal VOC Limit | 35% | | |
| CARB VOC Limit | 25% | | |
| Furniture Polish | | | |
| Water | 80.60% | 80.60% | 82.00% |
| VOC Solvents | 8.00% | — | — |
| Non-VOC Solvents | 2.60% | 10.60% | 15.00% |
| Surfactant | 1.20% | 1.20% | 1.00% |
| Wax | 0.60% | 0.60% | — |
| Hydrocarbon Propellant | 7.00% | 7.00% | 2.00% |
| TOTAL >>> | 100.00% | 100.00% | 100.00% |

TABLE 10-continued

Components of Aerosol Products.

| Component | Formula A | Formula B | Formula C |
|---|---|---|---|
| Compressed Gas Propellant | — | — | 30-170 psi |
| VOC Content | 15% | 7% | 2% |
| Federal VOC Limit | 25% | | |
| CARB VOC Limit | 17% | | |

Although other modifications and changes may be suggested by those skilled in the art, it is the intention of the inventors to embody within the patent warranted hereon all changes and modifications as reasonably and properly come within the scope of their contribution to the art.

We claim:

1. An aerosol product comprising:
   one or more aerosol formula concentrates;
   a liquefied gas with a vapor pressure;
   a compressed gas insoluble in the one or more aerosol formula concentrates and the liquefied gas; and
   a container;
   wherein the compressed gas and liquefied gas together provide an internal pressure to the aerosol product inside the container that is more than respectively each of the individual pressure of the compressed gas and the individual vapor pressure of the liquefied gas.

2. A foaming aerosol product comprising:
   one or more water-based aerosol formula concentrates;
   a liquefied gas insoluble in water with a vapor pressure;
   a compressed gas insoluble in the one or more aerosol formula concentrates and the liquefied gas; and
   a container;
   wherein the compressed gas and liquefied gas add internal pressure to the foaming aerosol product inside the container;
   wherein the internal pressure of the foaming aerosol product is more than the respective individual pressure of each of the pressure of the compressed gas and the vapor pressure of the liquefied gas.

3. The foaming aerosol product of claim 2 wherein the one or more aerosol formula concentrates are selected from the group consisting of glass cleaner, general purpose cleaner, stainless steel polish, dust mop treatment, and furniture polish.

4. The foaming aerosol product of claim 2 wherein the liquefied gas is selected from the group consisting of one or more LPGs, one or more HFCs, and a blend of one or more LPGs with one or more HFCs.

5. The foaming aerosol product of claim 2 wherein the one or more aerosol formula concentrates are selected from the group consisting of glass cleaner, general purpose cleaner, stainless steel polish, dust mop treatment, and furniture polish;
   the liquefied gas is selected from the group consisting of A-17, A-31, A-46, A-70, 134a, and 152a; and
   the compressed gas is nitrogen, at a pressure of about 20 psig to about 170 psig.

6. A method of filling an aerosol container comprising:
   introducing an amount of one or more aerosol formula concentrates into an aerosol container;
   introducing an amount of liquefied gas into the aerosol container; and
   introducing an amount of compressed gas into the aerosol container after introducing the amount of one or more aerosol formula concentrates and before introducing the amount of liquefied gas, wherein the compressed gas is insoluble in the amount of one or more aerosol formula concentrates.

7. The method of filling an aerosol container of claim 6 wherein the said amount of one or more aerosol formula concentrates includes a water-based concentrate.

8. The method of filling an aerosol container of claim 6, wherein the one or more aerosol formula concentrates are one or more foaming aerosol formula concentrates.

9. The method of filling an aerosol container of claim 8 further comprising clinching an aerosol valve onto the aerosol container prior to introducing both the amount of liquefied gas into the aerosol container and the amount of compressed gas into the aerosol container.

10. The method of filling an aerosol container of claim 8 further comprising clinching an aerosol valve onto the aerosol container after the introduction of the amount of compressed gas into the aerosol container and prior to introduction of the amount of liquefied gas into the aerosol container.

11. The method of filling an aerosol container of claim 6 further comprising clinching an aerosol valve onto the aerosol container prior to introduction of the amount of liquefied gas into the aerosol container and after introduction of the amount of compressed gas into the aerosol container.

12. The method of filling an aerosol container of claim 6 further comprising clinching an aerosol valve onto the aerosol container prior to introducing both the amount of liquefied gas and the amount of compressed gas into the aerosol container.

13. The method of filling an aerosol container of claim 12 wherein the one or more aerosol formula concentrates are selected from the group consisting of glass cleaner, general purpose cleaner, stainless steel polish, dust mop treatment, and furniture polish.

14. The method of filling an aerosol container of claim 12 wherein the liquefied gas is selected from the group consisting of one or more LPGs, one or more HFCs, and a blend of one or more LPGs with one or more HFCs.

15. The method of filling an aerosol container of claim 12 wherein the one or more aerosol formula concentrates are selected from the group consisting of glass cleaner, general purpose cleaner, stainless steel polish, dust mop treatment, and furniture polish; the compressed gas is nitrogen, at a pressure of about 20 psig to about 170 psig; and the liquefied gas is selected from the group consisting of A-17, A-31, A-46, A-70, 134a, and 152a.

16. The method of filling an aerosol container of claim 6 wherein the amount of liquefied gas introduced into the aerosol container after introducing the amount of compressed gas is from approximately 2% up to approximately 5% by weight of total product weight in the aerosol container.

17. The method of filling an aerosol container of claim 16 wherein the one or more aerosol formula concentrates are selected from the group consisting of glass cleaner, general purpose cleaner, stainless steel polish, dust mop treatment, and furniture polish.

18. The method of filling an aerosol container of claim 16 wherein the liquefied gas is selected from the group consisting of one or more LPGs, one or more HFCs, and a blend of one or more LPGs with one or more HFCs.

19. The method of filling an aerosol container of claim 16 wherein the one or more aerosol formula concentrates are selected from the group consisting of the following products: glass cleaner, general purpose cleaner, stainless steel polish, dust mop treatment, and furniture polish; the compressed gas is nitrogen, at a pressure of about 20 psig to about 170 psig; and the liquefied gas is selected from the group consisting of A-17, A-31, A-46, A-70, 134a, and 152a.

* * * * *

UNITED STATES PATENT AND TRADEMARK OFFICE
CERTIFICATE OF CORRECTION

| | | |
|---|---|---|
| PATENT NO. | : 8,191,739 B1 | Page 1 of 1 |
| APPLICATION NO. | : 12/246837 | |
| DATED | : May 22, 2012 | |
| INVENTOR(S) | : Randy S. Cash et al. | |

It is certified that error appears in the above-identified patent and that said Letters Patent is hereby corrected as shown below:

Column 8, lines 5-20 should read as follows:

Although one of the benefits of using both compressed gas and liquefied gas by using one of the two filling sequences is that less LPGs or HFCs are required, thus reducing the VOCs contained in the aerosol product while maintaining spray characteristics (e.g., foaming capabilities) another consideration in the manufacturing of aerosol containers are government regulations, such as the DOT regulations. See 49 CFR §173.306. As mentioned above, the DOT regulations set the maximum pressures limits at 130 degrees (Fahrenheit) for various aerosol containers of specified structure and strength. The highest pressure allowed for a commonly used aerosol container, designated a 2Q container, is 180 psig. The regulations also specify that a 2N-rated aerosol container must not exceed 140 psig at 130 degrees (Fahrenheit) and a 2P-rated container must not exceed 160 psig at 130 degrees (Fahrenheit).

Signed and Sealed this
Fourteenth Day of August, 2012

David J. Kappos
*Director of the United States Patent and Trademark Office*